May 4, 1937.   P. L. SPENCER   2,079,048
ARC WELDING SHIELD
Filed Sept. 27, 1934
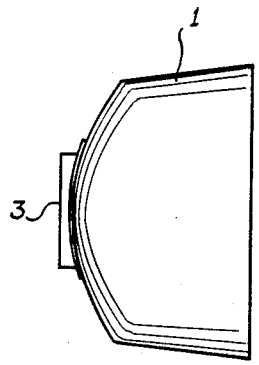
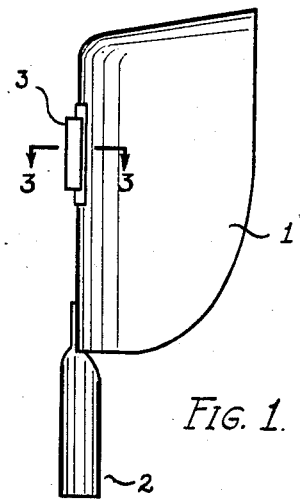
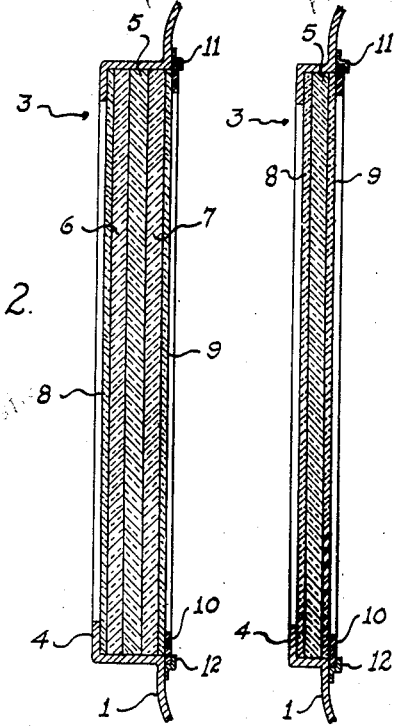
FIG. 1.   FIG. 2.   FIG. 3.   FIG. 4.
INVENTOR
Percy L. Spencer
Elmer J. Gorn.
ATTORNEY Patented May 4, 1937

2,079,048

UNITED STATES PATENT OFFICE 2,079,048

ARC WELDING SHIELD

Percy L. Spencer, West Newton, Mass., assignor to Raytheon Manufacturing Company, Newton, Mass., a corporation of Delaware Application September 27, 1934, Serial No. 745,730

4 Claims. (Cl. 2—8)

This invention relates to arc welding shields, and more particularly to the construction of windows for such shields.

An object of this invention is to provide a protective sheet for a welding shield window which will be durable, cheap, and which will remain transparent under usage for a long time.

The foregoing and other objects of this invention will be best understood from the following description of exemplifications of my invention, reference being had to the accompanying drawing, wherein:

Fig. 1 is a side view of a welding shield incorporating my invention;

Fig. 2 is a top view of the shield shown in Fig. 1;

Fig. 3 is a cross-section taken along line 3—3 of Fig. 1; and

Fig. 4 is a cross-section similar to Fig. 3 showing another embodiment of my invention.

Arc welding shields are usually provided with a window through which the operator may observe the arc during welding operation. In order to protect the eyes of the operator, the shield is usually provided with a filter glass colored so as to absorb the harmful radiations emitted by the arc and also a large part of the light emitted thereby. This filter glass is fairly expensive, and if unprotected would be subjected to bombardment by metal particles sputtered from the arc, and would soon be destroyed. Also there would be danger of breakage of this filter glass. In order, therefore, to protect the filter glass, another transparent sheet of relatively inexpensive material is provided as a cover glass for the filter glass. This cover glass is likewise subjected to the bombardment by molten metal particles sputtered from the arc. These metal particles upon colliding with the cover glass sometimes fuse to the surface thereof, and soon the cover glass is covered with a large number of these particles. Even if these particles do not actually fuse to the glass, the cover glass is pitted as a result of being bombarded in this manner. In any event, it has been found that the cover glass, when in use, very rapidly becomes so badly pitted and otherwise scratched that its transparency is destroyed to such an extent that it must be very quickly replaced. Even before replacement the operator must often stop to clean off the glass in order that the work may be properly observed. My present invention avoids the above difficulty by providing a transparent covering sheet for the window which retains its transparency for long periods of constant operation.

The embodiments of my invention shown in the drawing comprise a metal shield 1 having some convenient means for supporting it in front of the operator's eyes, such as, for example, a handle 2, and possessing a window 3 through which the operator may view the arc welding work. The window 3 comprises a frame 4 in which is supported a filter glass 5 on each side of which is provided cover glasses 6 and 7. In order to protect the above cover and the filter glasses, I provide in front of the cover glass 6 an additional transparent sheet 8. This sheet is preferably made of cellulose acetate. Any other non-inflammable cellulose compound may likewise be utilized for said protective sheet 8. I may also provide an additional sheet 9 in back of the cover glass 7 formed of a similar material to that of the protective sheet 8. The glasses 5, 6, 7 and the protective sheets 8 and 9 are removably supported within the frame 4, and may be retained in place by some suitable means, such as, for example, a spring element 10 which may be snapped into place behind retaining members 11 and 12.

During operation, when a particle of molten metal collides with the protective sheet 8, it does not fuse itself to said sheet but appears to be violently repelled therefrom. In accordance with my present understanding of the invention, this is due to the fact that the hot particles of metal, upon coming in contact with said protective sheet 8, heats it to such an extent that at the point of contact between the metal and the sheet, a gas is liberated in sufficient quantities to dislodge the hot metal particle from the surface of the sheet 8. I have found that although this action appears to take place, the surface of the protective sheet is not visibly pitted or scratched by such bombardment. I have also found that the fumes which are given off from the arc, particularly when welding rods of the coated type are used, do not appear to settle on the surface of the protective sheet, and therefore do not cloud it. With the use of ordinary cover glass, such clouding takes place very rapidly, and the operator must stop and wipe the glass off in order to maintain the requisite transparency of the window.

Although in Fig. 3 I have shown a window provided both with cover glasses 6 and 7 and also with the protective sheets 8 and 9, it is entirely feasible to omit the cover glasses and use merely my novel protective sheets. Fig. 4 illustrates such an embodiment of my invention. In Fig. 4 the window 3 is shown as containing the filter glass 5 and the two protective covering sheets 8 and 9 composed of the material specified above.

This invention is not limited to the particular details of construction and materials as described above. For example, instead of cellulose acetate, other non-inflammable organic compounds which locally liberate a small amount of gas upon contact with hot metal may likewise be used for the protective sheet. Also instead of using both protective sheets 8 and 9, the protective sheet 8 only could be used. Various other equivalents will suggest themselves to those skilled in the art. It is accordingly desired that the appended claims be given a broad interpretation commensurate with the scope of the invention within the art.

What is claimed is:

1. An arc welding shield comprising a window, including a filter glass and a protective sheet for said window, comprising a sheet of cellulose acetate covering the surface of said window adapted to be exposed to the welding arc.

2. An arc welding shield comprising a window, including a filter glass and a protective sheet for said window, comprising a transparent sheet of a non-inflammable cellulose compound covering the surface of said window adapted to be exposed to the welding arc.

3. An arc welding shield comprising a window, including a filter glass, a cover glass adjacent said filter glass, and a transparent sheet of a non-inflammable cellulose compound adjacent said cover glass.

4. An arc welding shield comprising a window including a filter glass, a cover glass adjacent said filter glass, and a sheet of cellulose acetate adjacent said cover glass.

PERCY L. SPENCER.